May 5, 1964 A. G. KVELLO-AUNE ET AL 3,131,776
MACHINE FOR ROTARY DRILLING
Filed Nov. 23, 1959
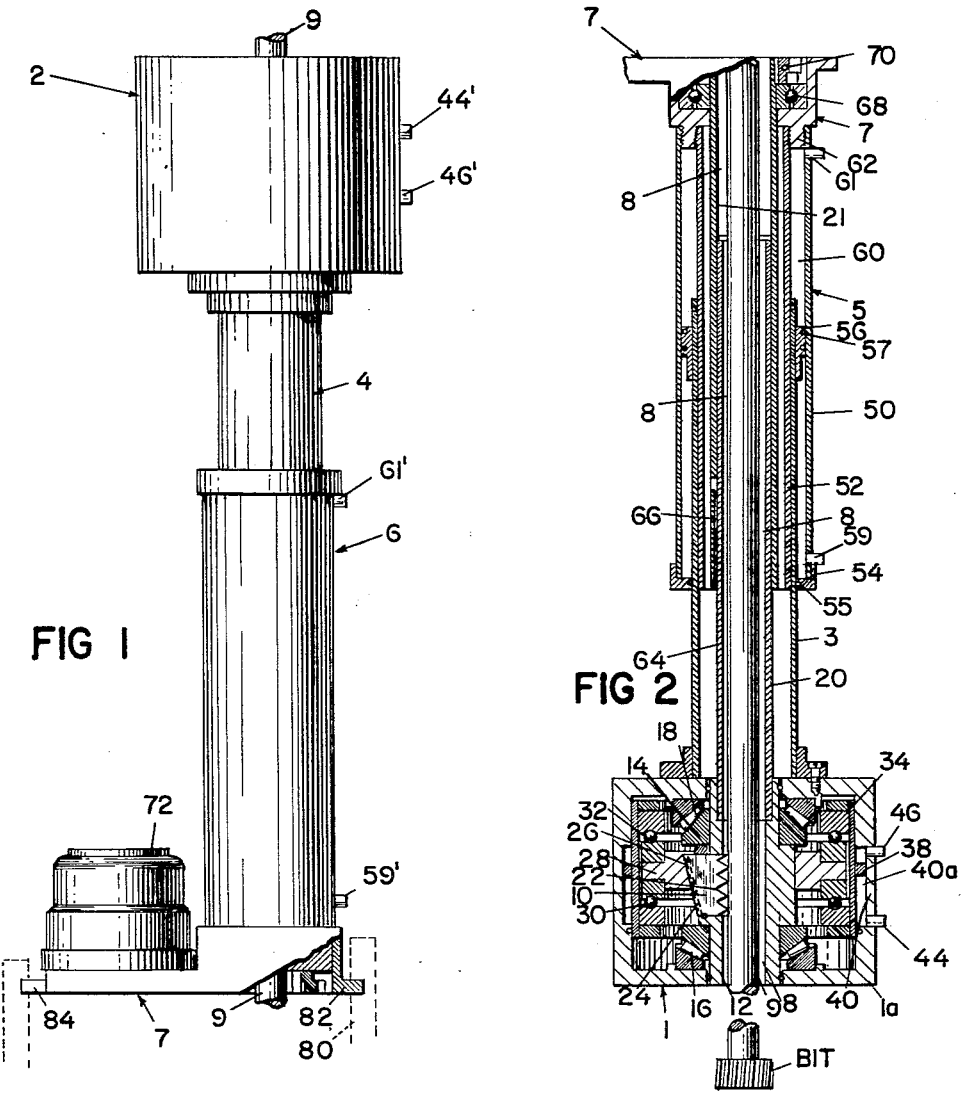
*Alf Gunnar Kvello-Aune
and
Per Fredrik Tröften*
INVENTORS
BY Wenderoth, Lind and Ponack
ATTORNEYS

United States Patent Office 3,131,776
Patented May 5, 1964

3,131,776
MACHINE FOR ROTARY DRILLING
Alf Gunnar Kvello-Aune, Trondheim, Norway, and Per Fredrik Tröften, Golden, Colo., assignors to Atlas Copco Aktiebolag, Nacka, Sweden, a company of Sweden
Filed Nov. 23, 1959, Ser. No. 854,942
Claims priority, application Norway Nov. 26, 1958
3 Claims. (Cl. 173—149)

The present invention relates to a machine for underground drilling, preferably for use in core drilling, and relates more specifically to a machine for continuous feeding and rotating of the drill bit.

Known machines for underground drilling can be divided into two main groups, namely machines for percussion drilling and for rotary drilling. The present invention relates to a machine for rotary drilling.

The main object of the invention is to provide a machine utilizing a larger proportion of the drilling time for net drilling.

Another object is to provide a machine which makes it possible for the operators in greater degree than heretofore to eliminate plugging.

Another object is to provide a machine which can perform the drilling operation continuously, until the core tube is full.

The machine according to the invention comprises a frame adapted to be fixed to the ground, said frame being furnished with a housing, said housing being equipped with two coaxially arranged drill chucks, each of which is operable to detachably engage a drill pipe, means for rotating said drill chucks, and means operable to impart to each of said drill chucks a reciprocating motion along said axis and relative to said housing.

The invention will now be described in connection with the accompanying drawing, which shows a preferred embodiment of a machine according to the invention, and where:

FIGURE 1 is a side view of the upper half of the machine,

FIGURE 2 is a sectional elevation of the lower half of the machine.

In general, as shown in the drawing, the machine comprises two drill chuck devices 1 and 2 respectively, fastened to tubular units, 3 and 4, which are telescopically connected to cylindrical elements 5 and 6, which at the ends closest to each other are fastened to a housing 7, provided with a motor 72. Parts 1, 2, 3, 4, 5, 6 and 7 are provided with a central bore in such a manner that the assembled machine has, as shown in the drawings, a continuous central passage 8 for a drill rod 9 which has a drill bit at the end thereof toward the ground.

The chuck devices 1 and 2 are identical in construction and will now be described with reference to the sectional elevation in FIGURE 2.

Clamp means in the form of clamps 10 are provided for the drill heads, there being preferably three or more clamps spaced from each other around the circumference of the drill rod 9. The clamps 10 are located in radial depressions in a cylindrical casing 12, which is journalled in the housing 1a for the chuck device 1 by means of suitable roller bearings 16 and 18. The holder 12 is rigidly coupled at its upper end 14 to a tubular driving shaft 20.

The clamps 10 are provided with suitable catching teeth 22 facing the drill rod 9, the radially outer ends 24 of clamp 10 being wedge-shaped and, as indicated by dotted lines, being provided with grooves 26. The clamps 10 are in engagement with a similar wedge-shaped annular unit 28 journalled in bearings 30 and 32, which in turn are journalled in a casing 34 slidably mounted in the housing 1a of chuck device 1. The casing 34 has a piston ring 38 on the outside thereof, the outer edge of which piston ring rests against the wall 40 of a ring-shaped recess 40a in the wall of the chuck housing, inlets and outlets 44 and 46 for a liquid or other medium opening into said recess.

The chuck device is fastened to the lower end of a hollow extensible and retractable means in the form of a cylinder 3, the upper end of which is telescopically slidable between two cylinders 50 and 52. Between the inside of the cylinder 3 and the outside of the cylinder 52 there is close sliding contact, while the cylinder 50 has a diameter such that between the outer side of cylinder 3 and the inner side of cylinder 5 there is positioned a ring-shaped chamber 60. The lower end of the chamber 60 is closed by a flange 54 attached to the cylinder 5, which has an inwardly opening groove with a packing ring 55 therein which slides against the cylinder 3. At their upper end both cylinder 5 and cylinder 52 are fastened to the motor housing 7 in such a manner that the housing forms the upper end wall of the chamber 60.

On the outside of the upper part of cylinder 3 there is provided, further, a ring-shaped piston 56, fitted with a packing ring 57, which slides against the inside of cylinder 5. Cylinder 5 is provided at each end with inlet and outlet openings 59 and 61.

The cylindrical driving shaft 20 fastened to upper end 14 of the holder 12 of the chuck is telescopically inserted in a driving shaft 21, shafts 20 and 21 being provided, further, with suitable interengaging grooves 64 and ridges 66 so that shafts 20 and 21 can be moved slidably but not rotatably in relation to each other.

The upper end of shaft 21 is journalled in the motor housing 7 in a bearing 68. Above this bearing, shaft 21 is provided with a cogwheel 70, which is coupled by means of a chain (not illustrated) to a motor 72.

Except for the motor 72 and certain parts of the motor housing, the upper half of the machine shown in FIG. 1 is identical with the half shown in FIG. 2, and it is deemed unnecessary to repeat the description of the individual parts.

The inlet and outlet openings 44, 46 and 59, 61 in FIG. 2 and the corresponding pipe connections in FIG. 1, 44', 46' and 59', 61', are coupled to a hydraulic or pneumatic system which is not shown in the drawing, which includes such units as a motor, pump, fluid container, valves and control devices. A system such as shown in Marks, Mechanical Engineers' Handbook, 4th Ed., p. 1797, FIG. 3 can be used on each piston 56 and each piston 38, or the four systems can be combined in ways which can be devised by those skilled in the art.

When the machine is to be used, the frame 80 is fixed to the ground and the machine is supported in the frame above the ground by means of brackets 82 and 84. A drill rod 9, which can be lifted by a conventional derrick structure as shown, for example, in McGraw Hill Encyclopedia of Science and Technology, vol. 9, p. 291, FIG. 1, p. 292, FIG. 2, is passed through the central passage 8 of the machine and placed such that the drill bit on the end of rod 9 abuts the ground surface (not illustrated). Drilling can now commence.

Hydraulic fluid under pressure is supplied through the pipe connection 44. The flange-shaped piston 38 and the units attached to this piston, the casing 24, the bearings 30 and 32 and the annular unit 28 are pushed upwards, while at the same time the clamps 10 are pressed inwardly, due to the wedge-shaped contact between unit 28 and the outer ends 24 of clamps 10, and into firm engagement with the drill rod 9. Then the driving motor 72 is started, with the result that the drill rod rotated from the driving wheel 70 through the shafts 21 and 20 to the clamp 10 through the holder 12, which together with the annular unit 28 can rotate in the chuck device housing on the bearings 16, 18, 30 and 32.

To impart the required axial pressure to the drill and the drill rod, fluid under pressure is now conducted into the chamber 60 through the pipe connection 61. The ring-shaped piston 56 together with the cylinder 3 and the chuck device with the drill rod held therein are pressed downwardly, while at the same time the pressure fluid leaves the lower end of chamber 60 through the pipe connection 59.

Simultaneously as chuck device 1 is moving downwards together with the drill rod, chuck device 2, which is rotating but is not engaged with the drill rod, may be moved upwardly by the introduction of fluid under pressure through the pipe connection 59' to its uppermost position. Thereupon the clamps in chuck device 2 are brought into engagement with the drill rod well before chuck device 1 has reached the position at which piston 56 is at the bottom of chamber 60 by introducing fluid under pressure through pipe connection 46', while pipe connection 44' returns the fluid present in chamber 40a of chuck device 2 to a fluid container. Thus during the lower part of the descending movement of chuck device 1 both chuck devices may be in engagement with the drill rod and rotate it. When chuck device 1 approaches the bottom position of piston 56 in chamber 60, however, fluid under pressure is supplied through pipe connection 46, while at the same time fluid is returned to a fluid container through connection 44.

This causes the clamp 10 of chuck device 1 to be released from the drill rod, with the result that chuck device 2 takes over the rotation as well as the feeding and lowering of the drill rod.

Chuck device 1 is then raised axially to a new catching position and the operations already described are repeated.

It is thus seen that the two chuck devices cooperate with each other so that while one of them is engaged with the drill pipe to rotate it and advance it, the other is disengaged from the pipe and moves in the direction opposite to the direction of the advance to reengage the drill pipe. Then while the other chuck device rotates and advances the drill pipe, the one chuck device is disengaged and moved to a position of new engagement. By properly timing the sequence of these movements, the drill pipe can be rotated and advanced continuously.

By employing such alternate application of the chuck devices in the drilling operation one may perform absolutely continuously both rotation and feeding, since while one chuck is in operation the other one may be reciprocated upwards for new setting, whereafter this chuck starts to act on the drill pipe before the first chuck is released for a new reciprocation etc., etc. The drilling operation will thus proceed continuously without stops or changes in the feeding pressures, until a new pipe section or drill rod section must be added to the string, or the whole string must be pulled to retrieve a core or replace a bit.

It will thus be seen that a greater proportion of the "gross drilling time," the time for inserting the drill pipe, drilling, spindling, withdrawal of the drill pipe and extraction of a core, is utilized for drilling, since the drilling does not stop while the rotating means is moved back along the drill pipe to take a fresh purchase on the drill pipe. One of the two chuck devices is always in engagement with the drill pipe and both rotating it and driving it downwardly.

Further, it will of course be understood that only one of the chuck devices can, if desired, be used, for example if the other needs to be exchanged or for any reason is out of service. Or, if unusually hard drilling is required, both chuck devices can be used for the drilling simultaneously, the one, whilst the other is engaged, being immediately raised and caused to engage again.

The machine for deep drilling, as hitherto described, can also be used in removing the drill pipe from the drilled hole. By a suitable design of the hydraulic controlling system, the raising of the pipe may proceed continuously, the chuck devices alternately gripping and raising the drill rod.

Other embodiments of the machine according to the invention can of course be conceived.

Since many other embodiments of this invention may occur to those skilled in the art, it is to be understood, that the foregoing is intended as illustrative of preferred embodiments and not as a limitation except as set forth in appended claims.

We claim:

1. A machine for rotating a drill pipe having a bit on the end thereof for rotary drilling, comprising a frame adapted to be fixed to the ground, a housing supported by said frame at a point spaced from the ground, two hollow extensible and retractable means which are axially aligned, one extending in one direction from said housing and the other extending in the other direction from said housing, two chuck devices, one on the end of each of the extensible and retractable means, each chuck device having clamping means for clamping and releasing the drill pipe, actuating means connected to said chuck devices for actuating said clamping means for releasing and clamping the drill pipe, and rotating means connected to said chuck devices for rotating said clamping means around the axis of alignment of said extensible and retractable means.

2. A machine as claimed in claim 1, in which said rotating means includes a hollow telescopic driving shaft concentric with the axis of alignment of said extensible and retractable means, one end of said shaft being connected to said clamping means in said chuck devices, and a motor on said frame to which the other end of said shaft is connected.

3. A machine for rotating a drill pipe having a bit on the end thereof for rotary drilling, comprising a frame adapted to be fixed to the ground, a housing supported by said frame at a point spaced from the ground, two hollow extensible and retractable means which are axially aligned, one extending in one direction from said housing and the other extending in the other direction from said housing, two chuck devices, one on the end of each of the extensible and retractable means, each chuck device comprising a chuck housing having clamps slidably mounted within said chuck housing for sliding movement back and forth perpendicular to the axis along which the extensible and retractable means and chuck devices are aligned, an annular clamp mounting means slidably mounted within said chuck housing for movement back and forth in said chuck housing along the axis of alignment and engageable with said clamps for reciprocating said clamps, mounting unit actuating means connected to said mounting unit for reciprocating said mounting unit, and rotating means connected to said mounting units in said chuck devices for rotating said mounting units and said clamps, the drill pipe being adapted to extend through said hollow extensible and retractable means and the annular clamp mounting unit.

References Cited in the file of this patent

UNITED STATES PATENTS

| | | |
|---|---|---|
| 1,817,467 | Thompson | Aug. 4, 1931 |
| 2,126,933 | Stone et al. | Aug. 16, 1938 |
| 2,613,060 | Trahan | Oct. 7, 1952 |